US012486150B2

(12) United States Patent
Mack

(10) Patent No.: US 12,486,150 B2
(45) Date of Patent: Dec. 2, 2025

(54) MOTORCYCLE LIFT

(71) Applicant: Stacey W. Mack, Hanover, PA (US)

(72) Inventor: Stacey W. Mack, Hanover, PA (US)

( * ) Notice: Subject to any disclaimer, the term of this patent is extended or adjusted under 35 U.S.C. 154(b) by 447 days.

(21) Appl. No.: 18/189,540

(22) Filed: Mar. 24, 2023

(65) Prior Publication Data

US 2024/0317554 A1 Sep. 26, 2024

(51) Int. Cl.
*B66F 7/00* (2006.01)
*B66F 7/28* (2006.01)

(52) U.S. Cl.
CPC .................................... *B66F 7/28* (2013.01)

(58) Field of Classification Search
CPC ............ B66F 7/065; B66F 7/28; B66F 7/243
See application file for complete search history.

(56) References Cited

U.S. PATENT DOCUMENTS 3,788,414 A * 1/1974 Netter .................. B66F 7/0641 187/203
2018/0134529 A1* 5/2018 Zecher ................. G01B 11/275
2019/0224735 A1* 7/2019 Venäläinen .............. B21D 1/14
2020/0325009 A1* 10/2020 Girard ..................... B66F 7/065
2023/0174355 A1* 6/2023 Koehler .................... B66F 7/04 187/203
2024/0228246 A1* 7/2024 Granata ................ B66F 7/0675
2024/0317554 A1* 9/2024 Mack ........................ B66F 7/28

* cited by examiner

*Primary Examiner* — Lee D Wilson
(74) *Attorney, Agent, or Firm* — Barley Snyder

(57) ABSTRACT

A motorcycle lift assembly comprising a stand assembly. The stand assembly having a platform assembly. The motorcycle lift assembly further comprising an adjustment assembly. The adjustment assembly having a pair of stabilizers. The adjustment assembly further having an outside adjustment assembly positioned on a far end of each stabilizer of the pair of stabilizers. The outside adjustment assembly having an outside adjustment modifier. The outside adjustment assembly further having a coupler positioned opposite the outside adjustment modifier. The adjustment assembly further having an inside adjustment assembly positioned away from the outside adjustment assembly. The inside adjustment assembly having a pair of u-shaped beams. The inside adjustment assembly further having an inside height modifier.

20 Claims, 12 Drawing Sheets

MOTORCYCLE LIFT

FIELD OF THE INVENTION

The present invention relates to a motorcycle lift assembly and, more particularly, to an adjustable motorcycle lift assembly for adjustable connection to a mount.

BACKGROUND

In general, motorcycle standalone lifts have been around for a while. However, the current motorcycle lifts do not allow for adaptability and mobility to contain a motorcycle while mounted on a lift beam of an automobile lift.

It is desirable to provide a motorcycle lift that can adapt by adjusting the configuration in order to conform to different dimensional configurations of the lift beam.

As the foregoing illustrates, the invention provides the motorcycle lift assembly to permit portability and adjustability when positioned on the lift beam of an existing automobile lift.

SUMMARY

A motorcycle lift assembly comprising a stand assembly. The stand assembly having a platform assembly. The platform assembly having a bike receiver. The platform assembly further having a wheel stop assembly positioned on a front end of the bike receiver. The wheel stop assembly having a front wheel receiver. The stand assembly further having a reinforcement assembly positioned at a front end of the wheel stop assembly. The stand assembly further having a ramp assembly. The ramp assembly having a slot piece. The ramp assembly further having a tapered member positioned at a first edge of the slot piece. The stand assembly further having a kickstand assembly. The kickstand assembly having a kickstand receiver. The motorcycle lift assembly further comprising an adjustment assembly. The adjustment assembly having a pair of stabilizers. The adjustment assembly further having an outside adjustment assembly positioned on a far end of each stabilizer of the pair of stabilizers. The outside adjustment assembly having an outside adjustment modifier. The outside adjustment assembly further having a coupler positioned opposite the outside adjustment modifier. The adjustment assembly further having an inside adjustment assembly positioned away from the outside adjustment assembly. The inside adjustment assembly having a pair of u-shaped beams. The inside adjustment assembly further having an inside height modifier.

BRIEF DESCRIPTION OF DRAWINGS

In the following, the present invention is described in more detail with references to the drawings in which.

DETAILED DESCRIPTION OF THE EMBODIMENT(S)

Figure 1:
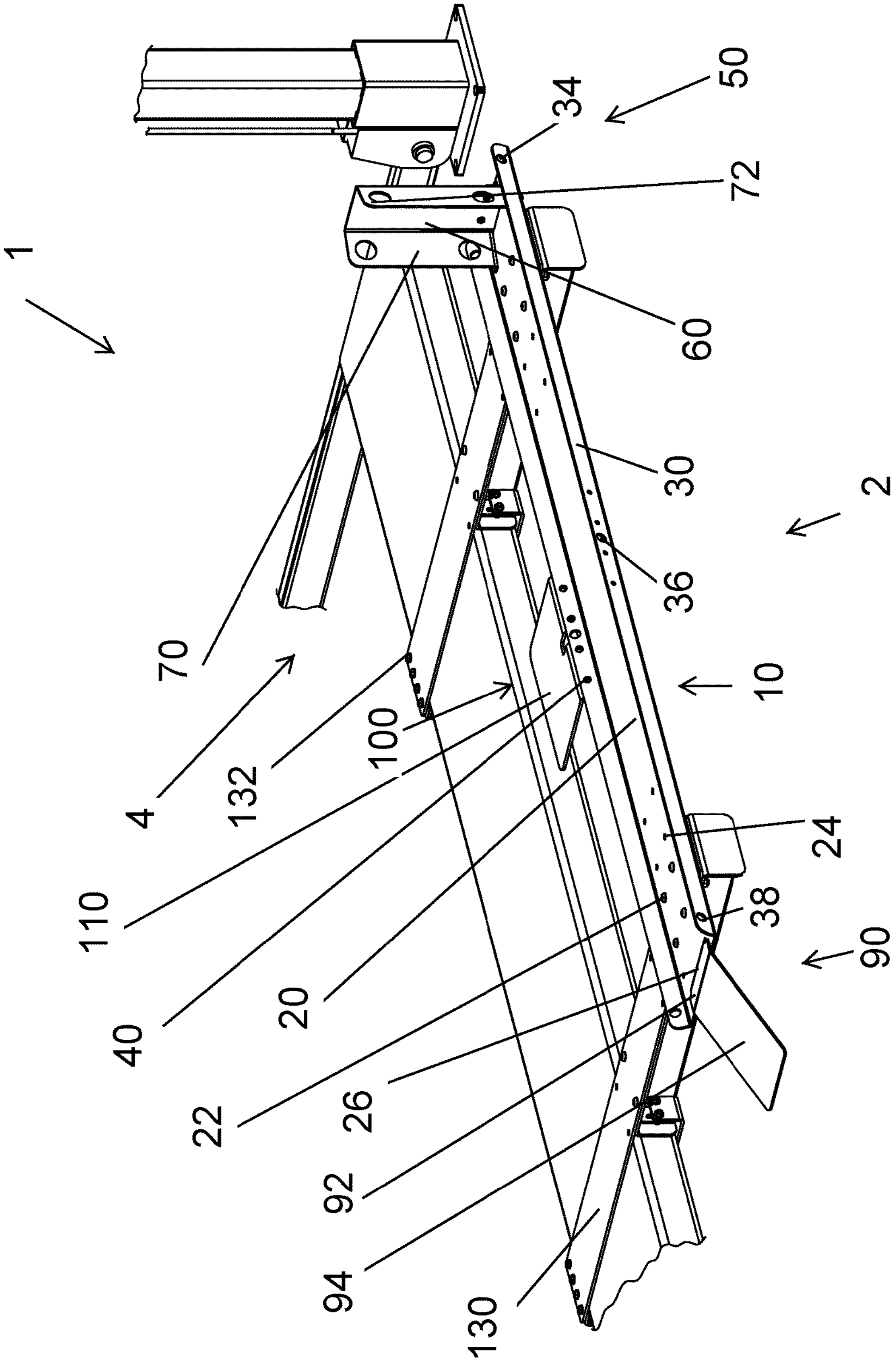
FIG. 1 is a rear, top, right side perspective view of a motorcycle lift assembly.

The present disclosure includes an adjustable motorcycle lift assembly 1 according to the invention. In the exemplary embodiment, the adjustable motorcycle lift assembly 1 generally has a stand assembly 2 and an adjustment assembly 4.

In the exemplary embodiment, the stand assembly 2 includes a platform assembly 10, a wheel stop assembly 50, a reinforcement assembly 80, a ramp assembly 90 and a kickstand assembly 100.

Figure 2:
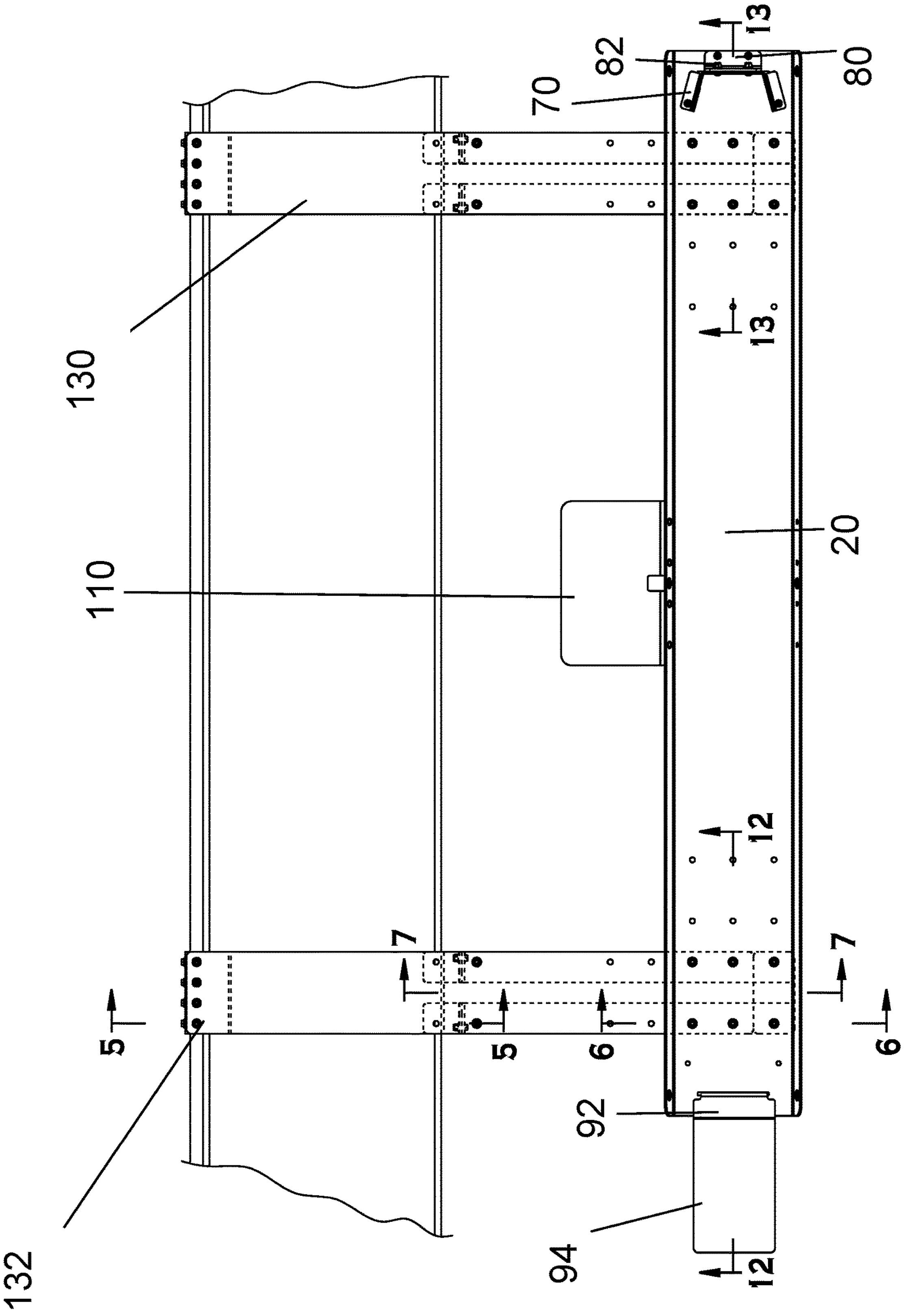
FIG. 2 is a top view of the invention of FIG. 1.
Figure 3:
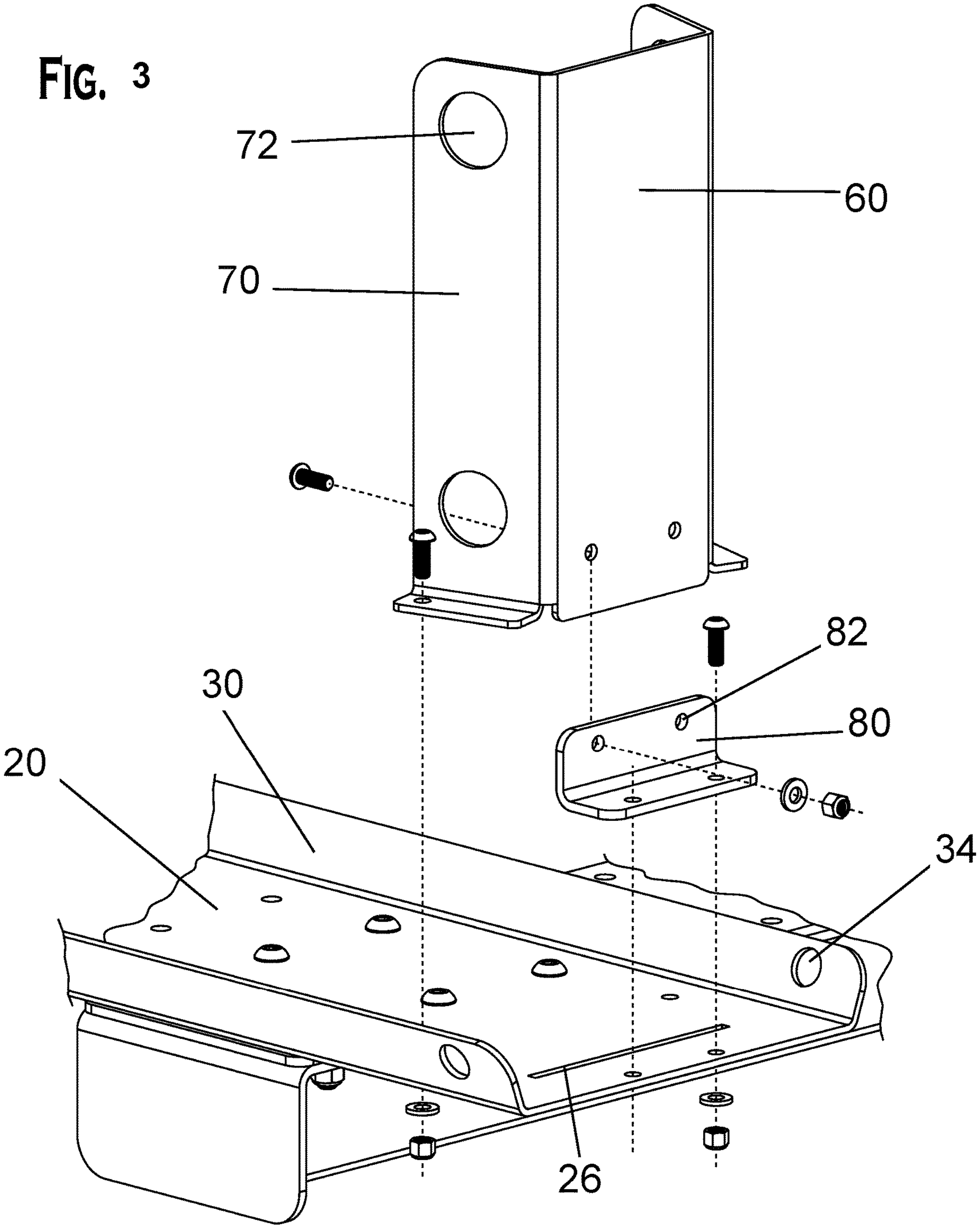
FIG. 3 is an exploded view of the invention of FIG. 2.
Figure 4:
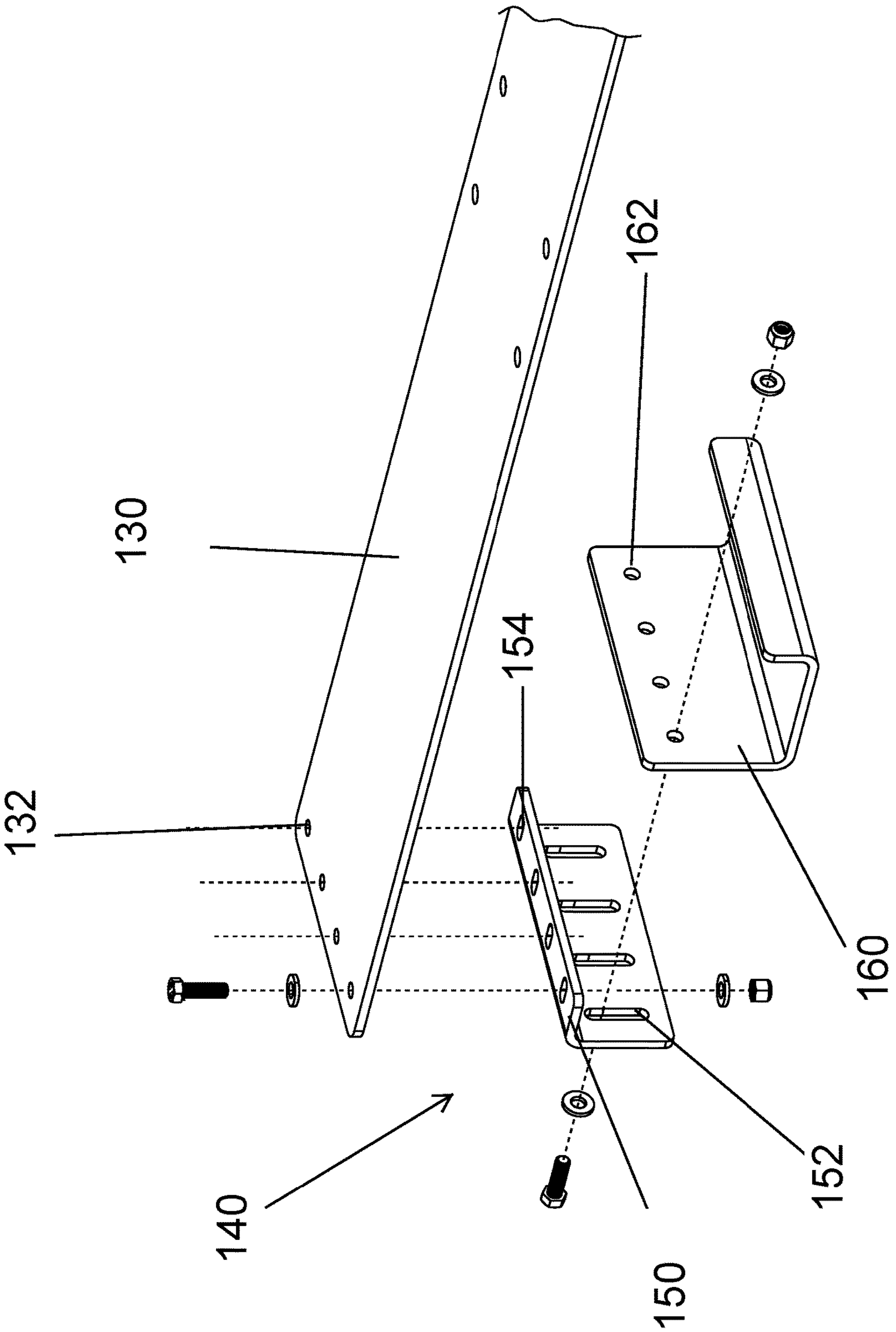
FIG. 4 is another exploded view of the invention of FIG. 3.
Figure 5:
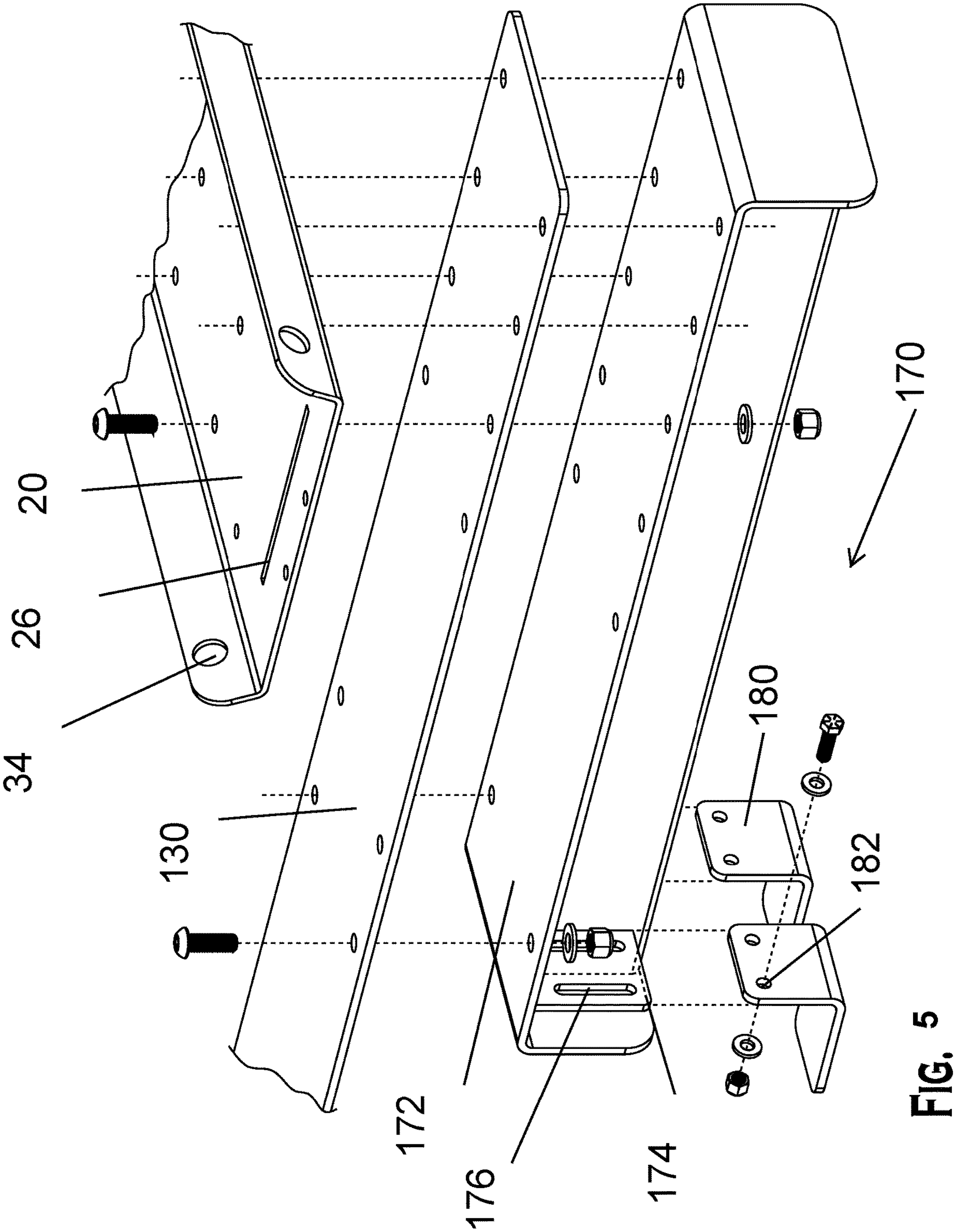
FIG. 5 is another exploded view of the invention of FIG. 4.
Figure 6:
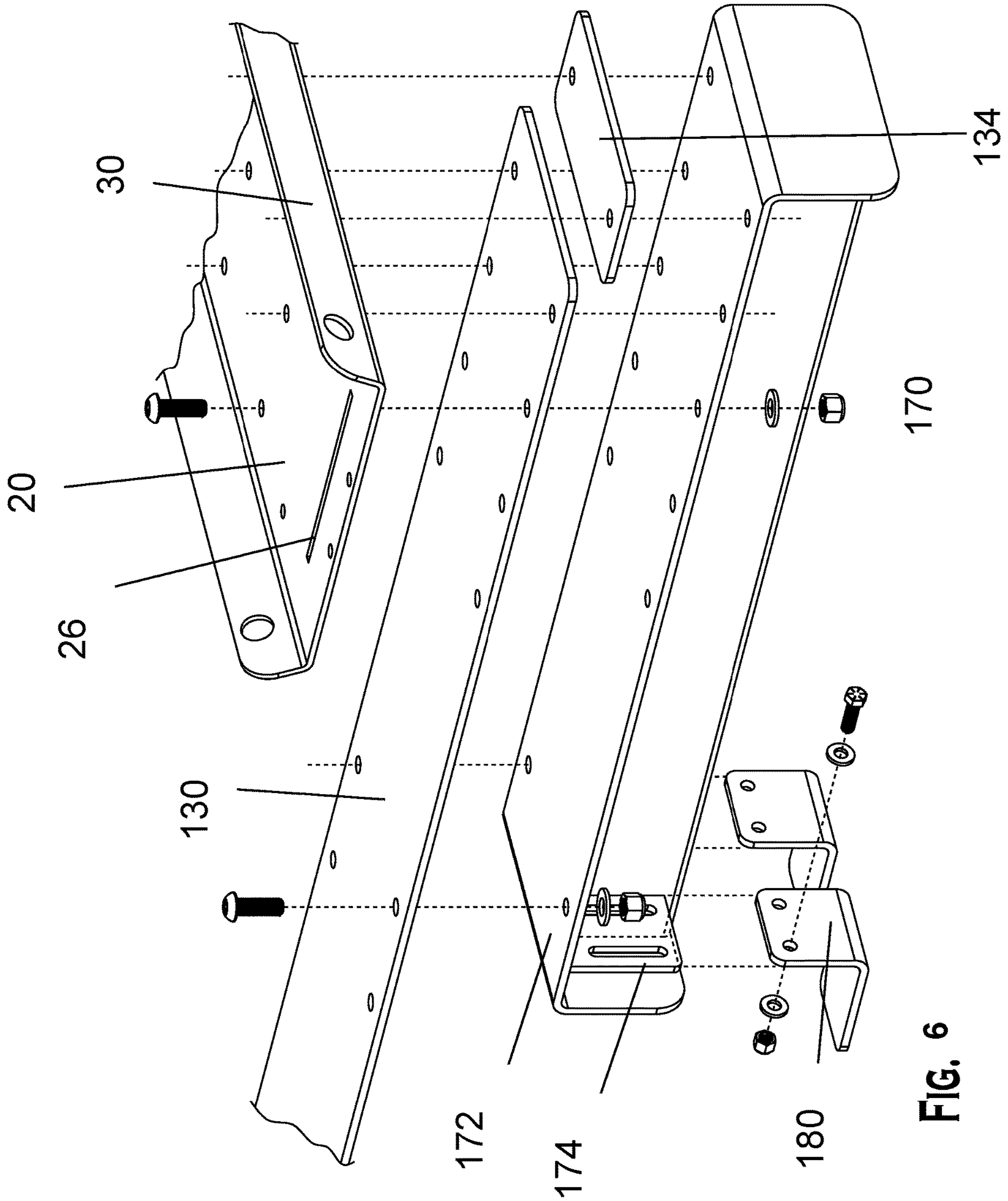
FIG. 6 is another exploded view of the invention of FIG. 5.
Figure 7:
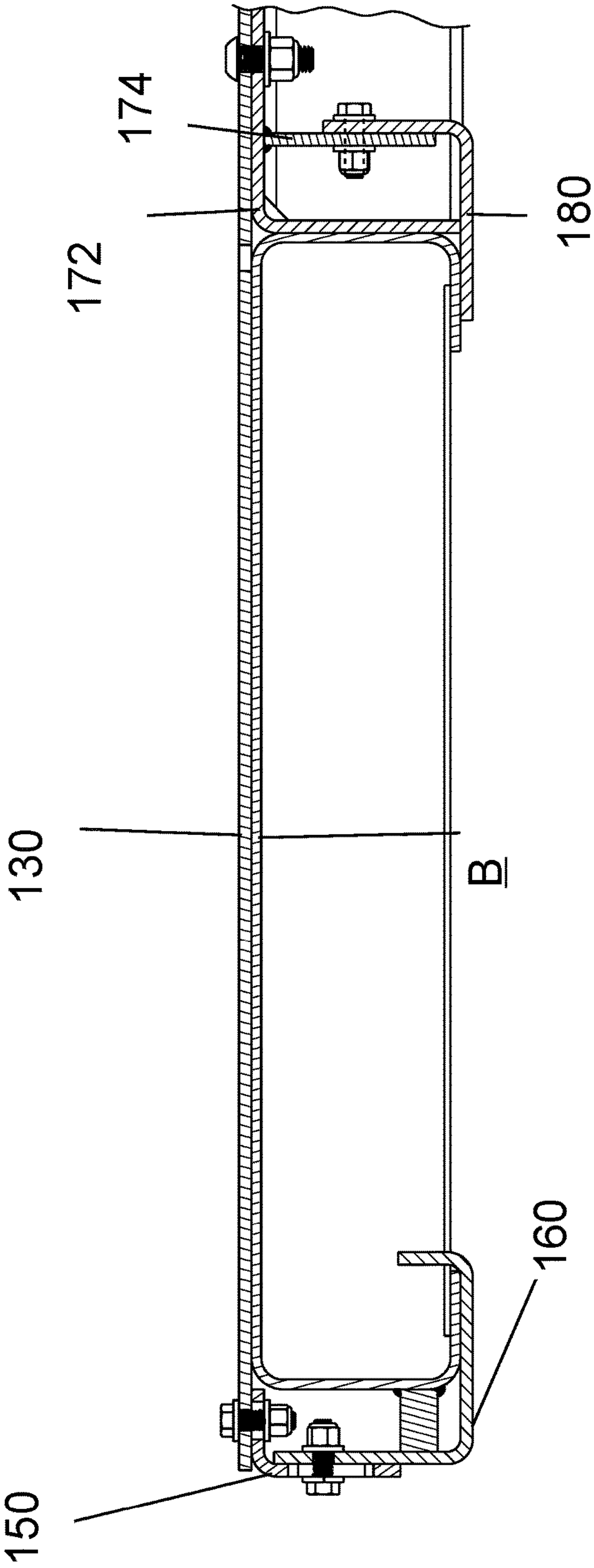
FIG. 7 is a cross sectional view of the invention of FIG. 6.
Figure 8:
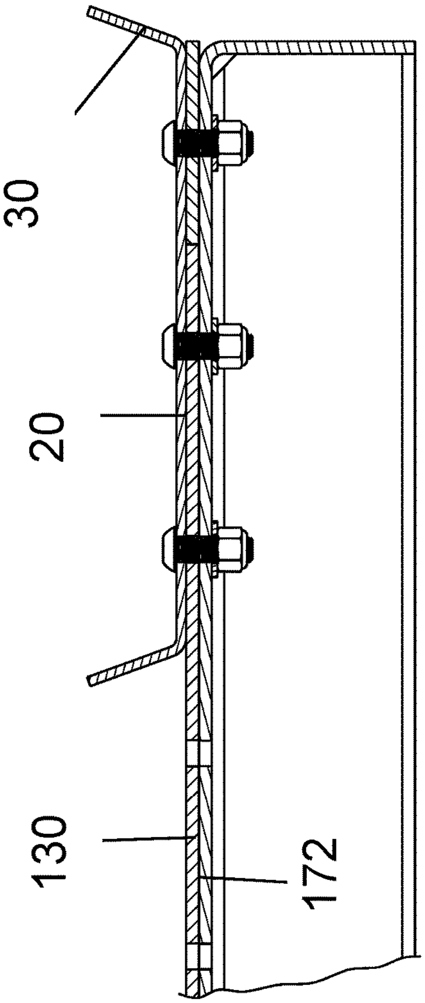
FIG. 8 is another cross sectional view of the invention of FIG. 7.
Figure 9:
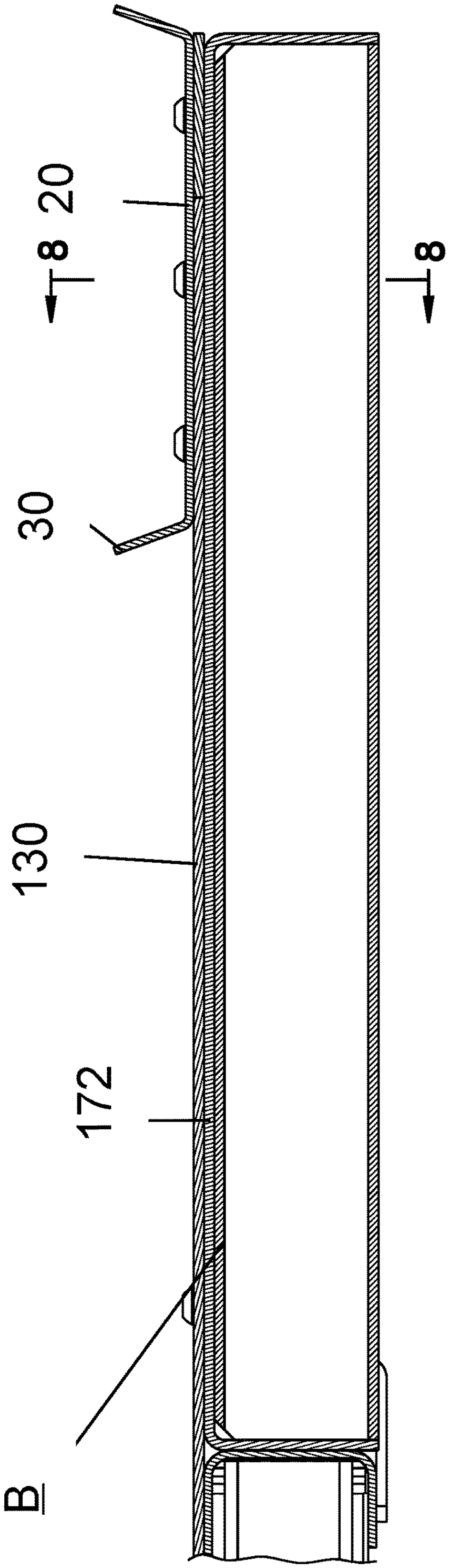
FIG. 9 is another cross sectional view of the invention of FIG. 8.
Figure 10:
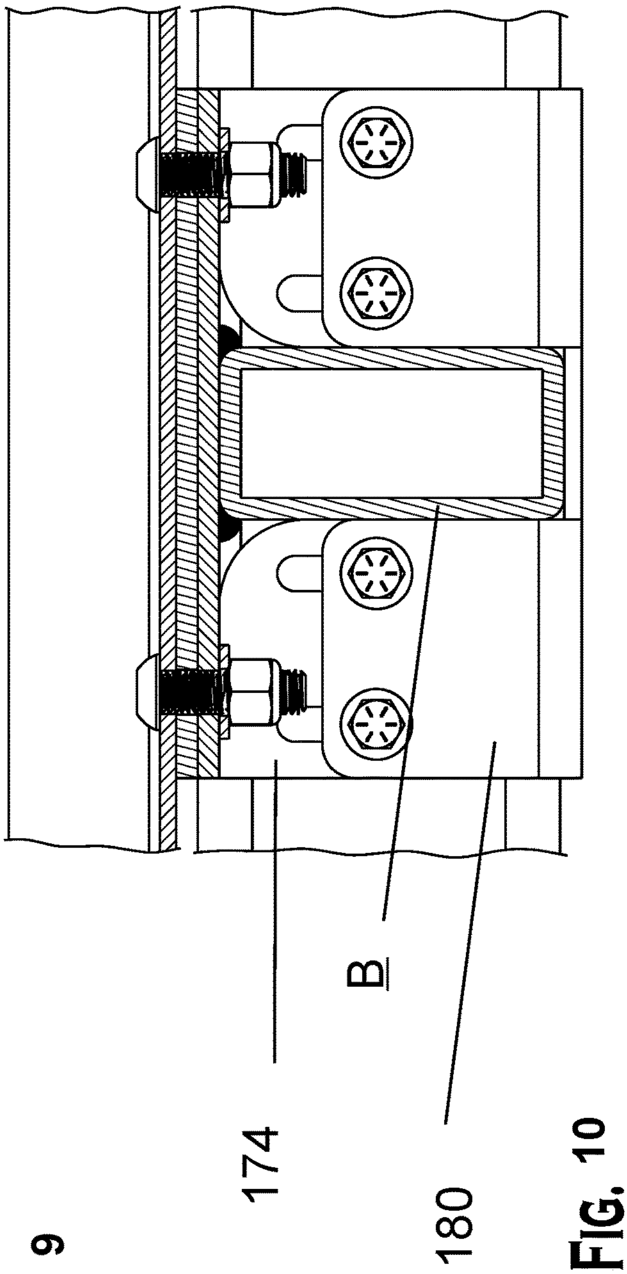
FIG. 10 is another cross sectional view of the invention of FIG. 9.
Figure 11:
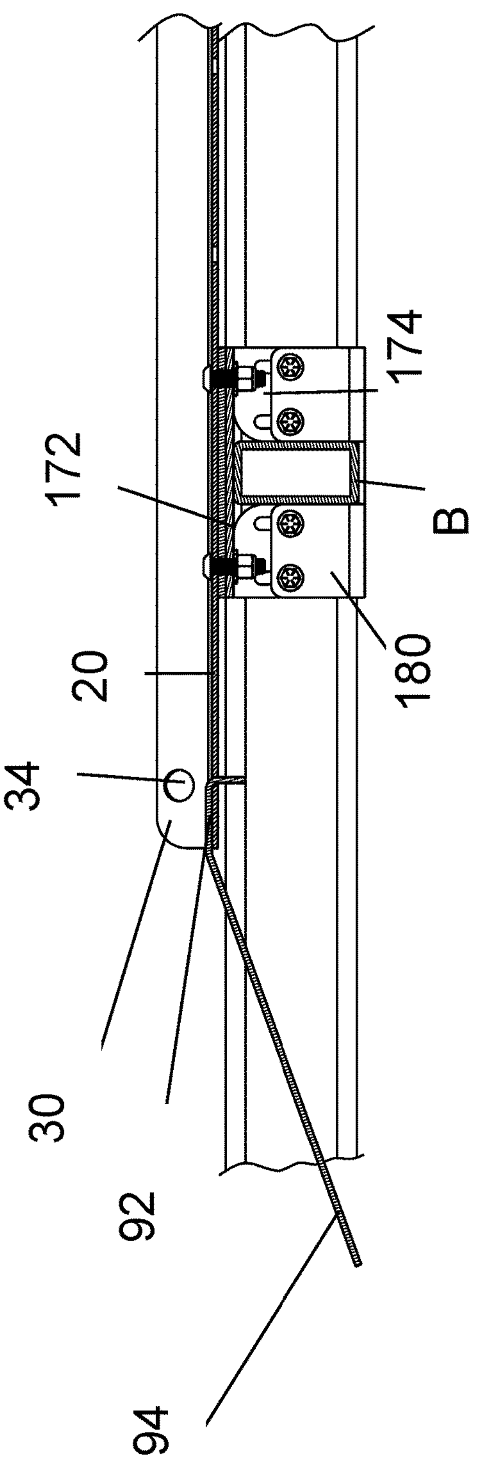
FIG. 11 is a right side view of the invention of FIG. 10.
Figure 12:
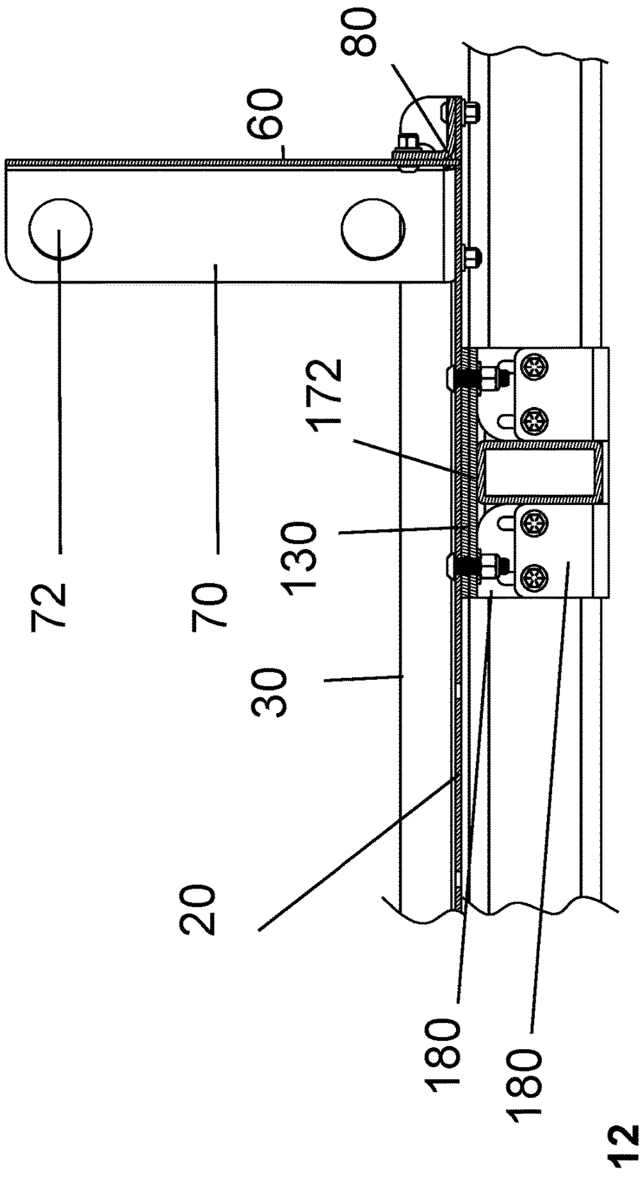
FIG. 12 is another right side view of the invention of FIG. 11.

As illustrated in FIGS. 1-3, the platform assembly 10 includes a bike receiver 20 and a pair of support walls 30.

As illustrated, the bike receiver 20 is an elongated member. The bike receiver 20 further includes a plurality of flat spacers 22. The bike receiver 20 further includes a plurality of fastener receiving passageways 24. The bike receiver 20 further includes a ramp slot 26. The ramp slot 26 is positioned at both a front end or a rear end of the bike receiver 20 as illustrated in FIG. 2.

As illustrated in FIG. 3, the pair of support walls 30 are sheet like members. Each support wall 30 includes a plurality of tie downs. The plurality of tie downs includes a pair of front tie downs 34, a pair of central tie downs 36 and a pair of rear tie downs 38 as illustrated in FIGS. 1-3. Each support wall 30 further includes a plurality of connection couplers 40 positioned in the central region of each support wall 30.

As illustrated, the wheel stop assembly 50 includes a front wheel receiver 60 and a pair of front wheel walls 70.

As illustrated, the front wheel receiver 60 is an elongated member. One skilled in the art would understand the applicant's design is not the exclusive embodiment.

As illustrated, the pair of front wheel walls 70 are flap like members. Each of the front wheel walls 70 include a pair of wheel stop receiving passageways 72.

As illustrated, the reinforcement assembly 80 is a hinge member. The reinforcement assembly 80 includes a plurality of fastener receiving passageways 82.

As illustrated, the ramp assembly 90 includes a slot piece 92. The slot piece 92 is an elongated plate like member. The ramp assembly 90 further includes a tapered member 94. The tapered member 94 is positioned adjacent the slot piece 92. One skilled in art would understand the applicant's design is not the exclusive embodiment.

As illustrated, the kickstand assembly 100 includes a kickstand receiver 110 and connection member 120.

As illustrated, the kickstand receiver 110 is a plate structure. One skilled in the art would understand the applicant's design is not the exclusive embodiment.

As illustrated, the connection member 120 is a structural support. The connection member 120 further includes a plurality of kickstand connectors 122.

In the exemplary embodiment, the adjustment assembly 4 generally includes a pair of stabilizers 130, an outside adjustment assembly 140 and an inside adjustment assembly 170.

As illustrated, each stabilizer of the pair of stabilizers 130 is an elongated member. Each stabilizer 130 further includes a plurality of stabilizing connectors 132 as illustrated. The stabilizer 130 further include a spacer plate 134. The spacer plate 134 is positioned adjacent the stabilizer 130 in order to fill a void when mounted to a wider lift beam.

As illustrated, the outside adjustment assembly 140 includes an outside adjustment modifier 150. Each outside adjustment modifier 150 is hinge shaped. Each outside adjustment modifier 150 includes an outside height modifier 152. The outside height modifier 152 is a slot member. Each outside adjustment modifier 150 further includes an outside extension modifier 154. The outside extension modifier 154 is a slot member positioned on an opposite face from the outside height modifier 152.

As illustrated, the outside adjustment assembly 140 further includes a coupler 160. The coupler 160 is a J-shaped member. The coupler 160 further includes a plurality of passageways 162.

As illustrated, the inside adjustment assembly 170 includes a u-shaped beam 172. The u-shaped beam 172 further includes an inside height modifier 174. The inside height modifier 174 is a plate positioned within the u-shaped beam 172. The inside height modifier 174 further includes a slot 176.

The inside adjustment assembly 170 further includes a pair of couplers 180. The pair of couplers 180 are hinge members. Each of the couplers 180 further includes a passageway 182.

Figure 13:
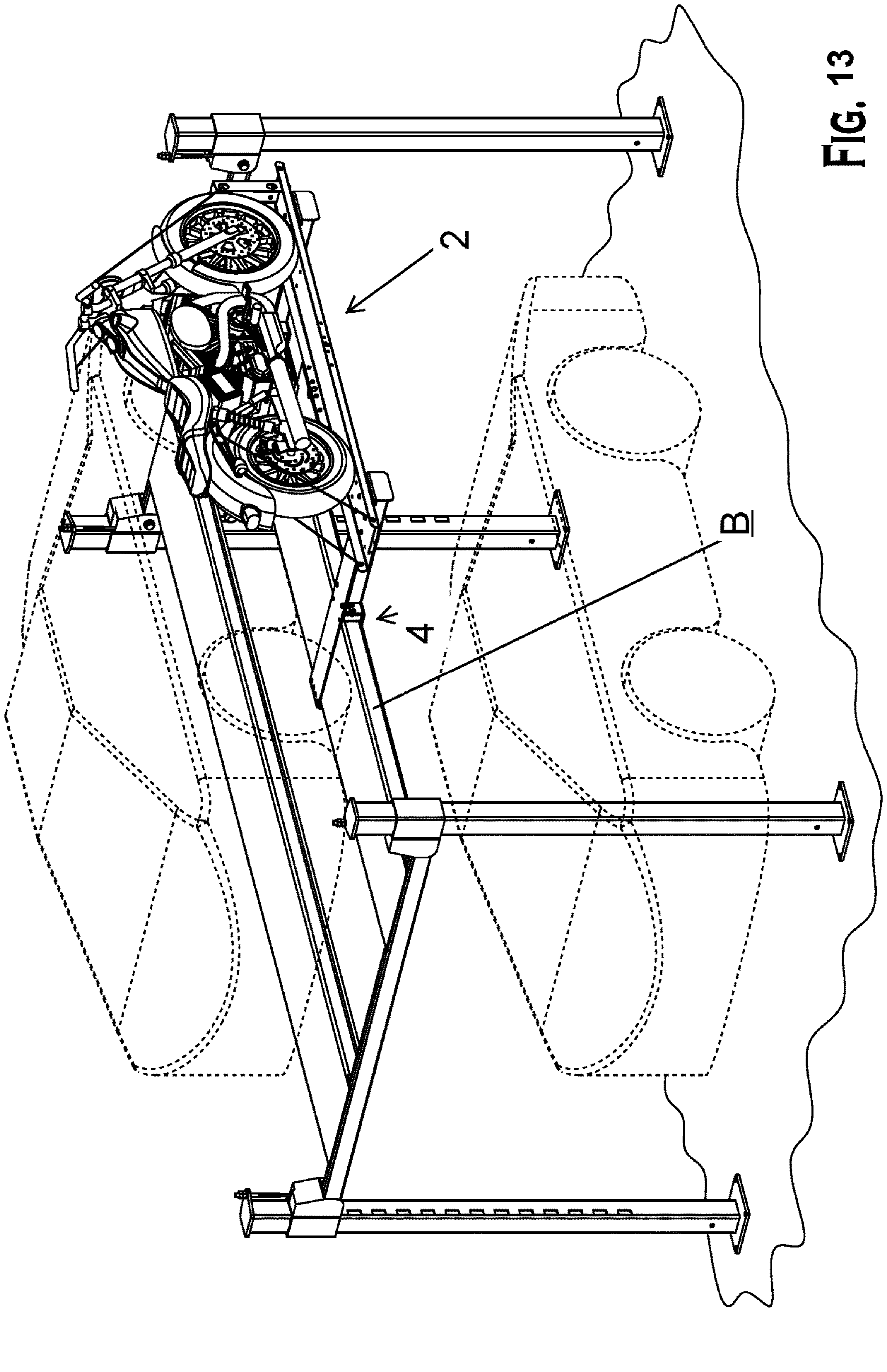
FIG. 13 is a top, rear, right side view of the invention of FIG. 12.
Figure 14:
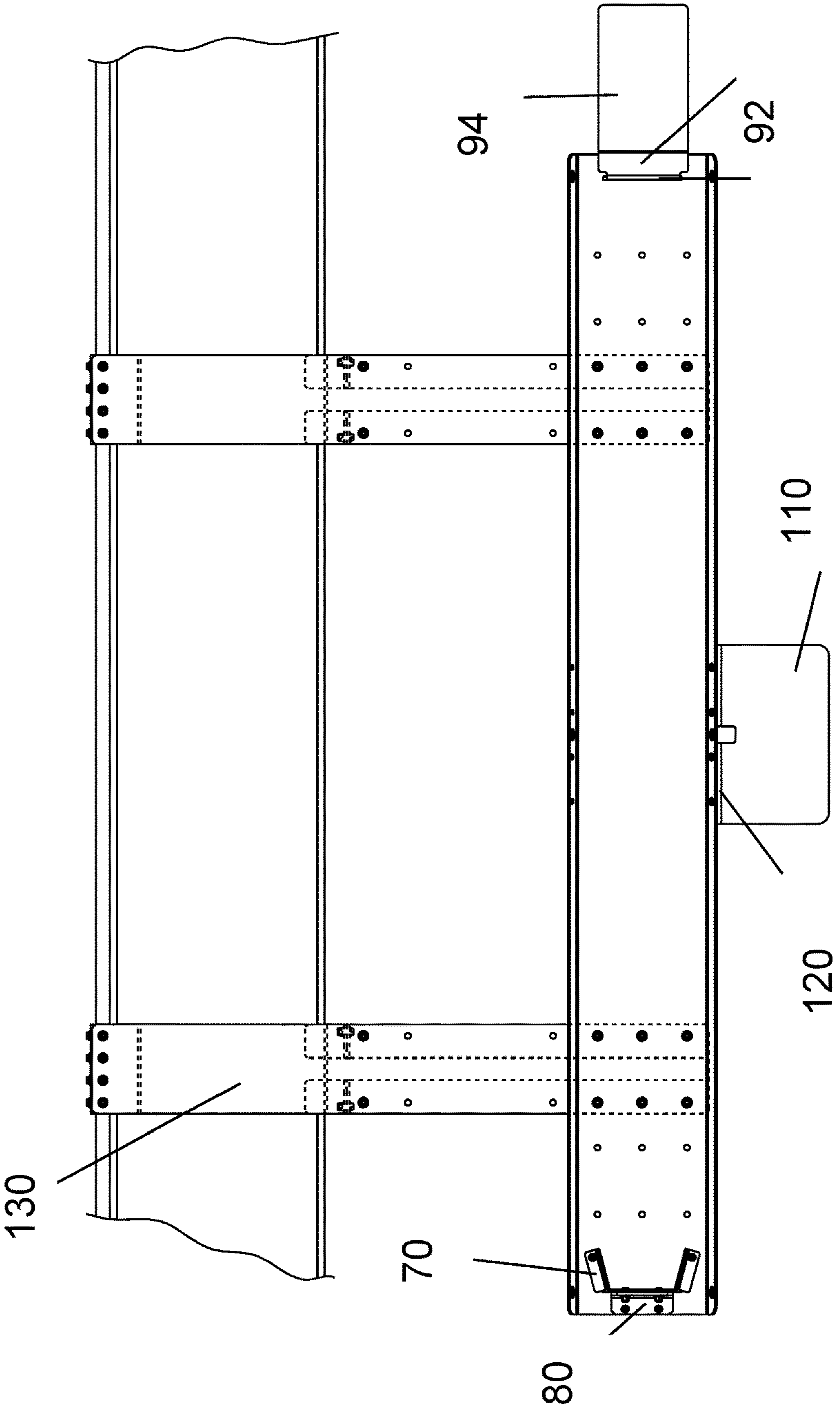
FIG. 14 is another top view of the invention of FIG. 13.
Figure 15:
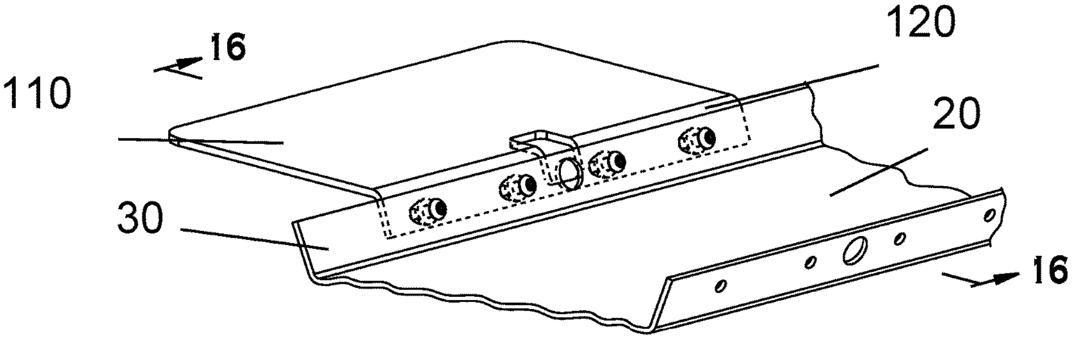
FIG. 15 is an enlarged view of the invention of FIG. 14.
Figure 16:
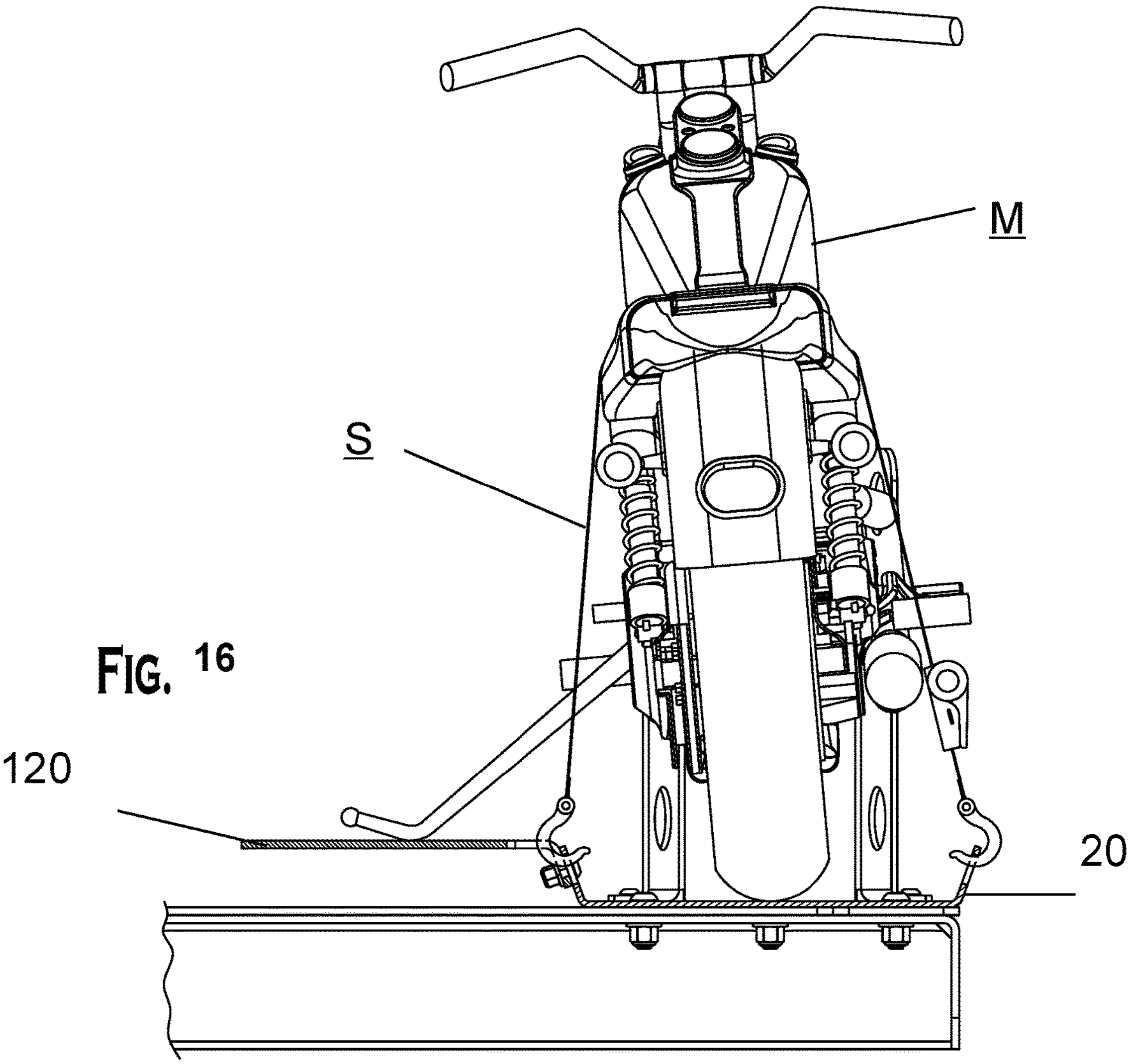
FIG. 16 is a rear view of the invention of FIG. 15.

As assembled, an operator chooses an existing lift beam B of an automobile lift as shown in FIG. 13. The pair of support walls 30 are positioned on parallel edges of the bike receiver 20. In another embodiment, the pair of support walls 30 and the bike receiver 20 is a single structural member. One skilled in the art would understand the applicant's design is not the exclusive embodiment.

The pair of front wheel walls 70 are positioned on parallel edges of the front wheel receiver 60. In another embodiment, the pair of front wheel walls 70 and the front wheel receiver 60 are a single structural member. The wheel stop assembly 50 is positioned on the bike receiver 20. The wheel stop assembly 50 can be positioned at either end of the bike receiver 20.

The reinforcement assembly 80 is positioned at a front end of the wheel stop assembly 50 and coupled to both the wheel stop assembly 50 and the bike receiver 20. The tapered member 94 is positioned and fixed at an edge of the slot piece 92. In another embodiment, the tapered member 94 and the slot piece 92 are a single structural member. The slot piece 92 is removably positioned within the ramp slot 26 which is located at either the front end or the rear end of the bike receiver 20.

The kickstand receiver 110 is positioned and coupled to an edge of the connection member 120. In another embodiment, the kickstand receiver 110 and the connection member 120 are a single structural member. The connection member 120 is coupled to one of the support walls 30 by aligning the kickstand connectors 122 with the connection couplers 40.

As illustrated, the ramp assembly 90 is positioned within the ramp slot 26 of the bike receiver 20. The kickstand receiver 110 is coupled to an outer side of either support wall of the pair of support walls 30. A fastener couples the kickstand connectors 122 to the connection couplers 40 of the bike receiver 20.

As illustrated, the u-shaped beam 172 is positioned parallel to the lift beam B. The pair of stabilizers 130 are positioned across the u-shaped beams 172 and are connected to the u-shape beams 172 by the plurality of stabilizing connectors 132.

In an alternate embodiment, the spacer plate 134 will be utilized in order to fill the void when mounted to a wider lift beam and will be fastened to the u-shaped beam 172 in addition to the stabilizer 130.

The inside height modifier 174 is positioned within an inner edge of each of the u-shaped beams 172. The pair of couplers 180 are positioned across from the inside height modifier 174 and coupled by inserting a fastener through the slot 176 and passageway 182. Each of the u-shaped beams 172 becomes flush with an inner end of the lift beam B.

The outside extension modifier 154 is positioned above the stabilizer 130 and consequently, the outside height modifier 152 is positioned at a far end of the stabilizer 130. The coupler 160 is positioned opposite the outside adjustment modifier 150. Specifically, the coupler 160 is positioned against the outside height modifier 152 and coupled by inserting a fastener through the outside height modifier 152 and the plurality of passageways 162. The coupler 160 becomes flush and cradles a far end of the lift beam B.

The bike receiver 20 is positioned on each of the stabilizers 130 and fastened by coupling the flat spacers 22 with each of the stabilizers 130.

As illustrated, a length of the bike receiver 20 is about 104 inches+/−1/16". In another embodiment, a length of the bike receiver 20 is about 104 inches+/−0.03". In another embodiment, a length of the bike receiver 20 is about 104 inches+/−0.015". In another embodiment, a length of the bike receiver 20 is about 104 inches+/−0.0005". One skilled in the art would understand the applicant's design is not the exclusive embodiment.

As illustrated, a width of the bike receiver 20 is about 13 inches+/−1/16". In another embodiment, a width of the bike receiver 20 is about 13 inches+/−0.03". In another embodiment, a width of the bike receiver 20 is about 13 inches+/−0.015". In another embodiment, a width of the bike receiver 20 is about 13 inches+/−0.0005". One skilled in the art would understand the applicant's design is not the exclusive embodiment.

As illustrated, a width of the bike receiver 20 to a far end of the stabilizer 130 is about 59.50 inches+/−1/16". In another embodiment, a width of the bike receiver 20 to a far end of the stabilizer 130 is about 59.50 inches+/−0.03". In another embodiment, a width of the bike receiver 20 to a far end of the stabilizer 130 is about 59.50 inches+/−0.015". In another embodiment, a width of the bike receiver 20 to a far end of the stabilizer 130 is about 59.50 inches+/−0.0005". One skilled in the art would understand the applicant's design is not the exclusive embodiment.

As illustrated, a length between each end of the stabilizer 130 is about 88 inches+/−1/16". In another embodiment, a length between each end of the stabilizer 130 is about 88 inches+/−0.03". In another embodiment, a length between each end of the stabilizer 130 is about 88 inches+/−0.015". In another embodiment, a length between each end of the stabilizer 130 is about 88 inches+/−0.0005". One skilled in the art would understand the applicant's design is not the exclusive embodiment.

An operator is able to attach and detach the motorcycle lift assembly 1 from the lift beam B of the automobile lift and position the motorcycle lift assembly 1 on a different lift beam B of a different automobile lift. Additionally, the operator may adjust the length and height of the stabilizer 130 to compensate for the different dimensional configurations of the lift beam B by adjusting the outside adjustment assembly 140 and the inside adjustment assembly 170.

In the exemplary embodiment, the operator increases and decreases the length of the stabilizer 130 by adjusting the fastener positioned in the outside extension modifier 154 and adjusting the fastener in a forward position or a rear position.

In the exemplary embodiment, an operator increases and decreases the height of the stabilizer 130 by adjusting the fasteners positioned in both the outside adjustment modifier 150 and the inside height modifier 174. The fasteners are moved in an upwards position in order to increase an overall height of the motorcycle lift assembly 1. Additionally, the fasteners are moved in a downwards position in order to decrease the overall height of the motorcycle lift assembly 1.

A motorcycle M is then positioned on the bike receiver 20 and the movement of the motorcycle M is restricted by a plurality of straps S threaded through each of the front tie downs 34, each of the central tie downs 36 and each of the rear tie downs 38.

It should be noted that various changes and modifications to the embodiments described herein will be apparent to those skilled in the art. Such changes and modifications may be made without departing from the spirit and scope of the present invention and without diminishing its intended advantages. For example, various embodiments of the assembly and methods may be provided based on various combinations of the features and functions from the subject matter provided herein.

What is claimed is:

1. A motorcycle lift assembly comprising:
a stand assembly having:
  a platform assembly having:
    a bike receiver; and
  a wheel stop assembly positioned on a front end of the bike receiver having:
    a front wheel receiver; and
  a reinforcement assembly positioned at a front end of the wheel stop assembly; and
  a ramp assembly having:
    a slot piece; and
    a tapered member positioned at a first edge of the slot piece; and
  a kickstand assembly having:
    a kickstand receiver; and
an adjustment assembly having:
  a pair of stabilizers;
  an outside adjustment assembly positioned on a far end of each stabilizer of the pair of stabilizers having:
    an outside adjustment modifier; and
    a coupler positioned opposite the outside adjustment modifier; and
  an inside adjustment assembly positioned away from the outside adjustment assembly having:
    a pair of u-shaped beams; and
    an inside height modifier.

2. The motorcycle lift assembly of claim 1, wherein the outside adjustment modifier includes an outside height modifier.

3. The motorcycle lift assembly claim 2, wherein the outside adjustment modifier further includes an outside extension modifier.

4. The motorcycle lift assembly of claim 3, wherein a length of each stabilizer of the pair of stabilizers is adjustably altered by the outside extension modifier.

5. The motorcycle lift assembly of claim 4, wherein a height of each stabilizer is adjustably altered by the outside height modifier.

6. The motorcycle lift assembly of claim 5, wherein the height of each stabilizer is adjustably altered by the inside height modifier.

7. The motorcycle lift assembly of claim 6, wherein the inside height modifier is positioned within an inner edge of each u-shaped beam.

8. The motorcycle lift assembly of claim 7, wherein each u-shaped beam becomes flush with an inner end of a lift beam.

9. The motorcycle lift assembly of claim 8, wherein the coupler of the outside adjustment assembly, cradles a far end of the lift beam.

10. The motorcycle lift assembly of claim 9, wherein the tapered member is removable.

11. The motorcycle lift assembly of claim 10, wherein coupler of the outside adjustment assembly is positioned against the outside height modifier.

12. The motorcycle lift assembly of claim 11, wherein the platform assembly further includes a pair of support walls positioned on parallel edges of the bike receiver.

13. The motorcycle lift assembly of claim 12, wherein each support wall includes a plurality of tie downs comprising a pair of front tie downs, a pair of central tie downs and a pair of rear tie downs.

14. The motorcycle lift assembly of claim 13, wherein each support wall further includes a plurality of connection couplers.

15. The motorcycle lift assembly of claim 14, wherein the wheel stop assembly further includes a pair of front wheel walls positioned on parallel edges of the front wheel receiver.

16. The motorcycle lift assembly of claim 15, wherein each front wheel wall includes a pair of wheel stop receiving passageways.

17. The motorcycle lift assembly of claim 16, wherein the kickstand assembly further includes a connection member coupled to one a support wall of the pair of support walls.

18. The motorcycle lift assembly of claim 17, wherein the bike receiver further includes a ramp slot.

19. The motorcycle lift assembly of claim 18, wherein the slot piece is positioned within the ramp slot.

20. The motorcycle lift assembly of claim 19, wherein the kickstand receiver is positioned and coupled to an edge of the connection member.

* * * * *